Aug. 5, 1969  P. C. DOOLEY, JR  3,458,960
PRESSURE APPLYING APPARATUS

Filed April 28, 1967  3 Sheets-Sheet 1

INVENTOR.
PETER C. DOOLEY
BY

INVENTOR.
PETER C. DOOLEY

United States Patent Office 3,458,960
Patented Aug. 5, 1969

3,458,960
PRESSURE APPLYING APPARATUS
Peter C. Dooley, Jr., Lewiston, N.Y., assignor to The Carborundum Company, Niagara Falls, N.Y., a corporation of Delaware
Filed Apr. 28, 1967, Ser. No. 634,558
Int. Cl. B24b 47/02, 7/00, 9/00
U.S. Cl. 51—215                                    9 Claims

ABSTRACT OF THE DISCLOSURE

A pressure applying apparatus for exerting a grinding force on workpieces to rapidly remove metal or the like therefrom. The apparatus includes a work rest upon which workpieces of different sizes and configuration are placed and a pressure applying means to press the workpiece against a grinding wheel or the like.

---

This invnetion relates to a pressure applying apparatus and, more particularly, to a means for exerting a grinding force on workpieces to rapidly remove metal therefrom. Although the present invention may be used in connection with tools of various types, it will be convenient to refer specifically to its use in association with a grinding wheel of the heavy-duty snagging type.

In grinding operations where an operator pushes the workpiece against the grinding wheel by hand, efficiency and safety are sacrificed because of operator fatigue. Moreover, the operator may be unable to apply the proper pressure to the workpiece due to the high pressure required or the awkward configuration of the workpiece. In some operations where work holders are employed, the work holding fixtures may be devoted exclusively for clamping work of a particular type. For example, some work holders are adapted to accommodate different sizes of round stock, while other types of holders have been devised for the clamping of angles, and still others have been designed for the clamping of other specific shapes. Unless many pieces of the same shape are to be worked on, it is readily apparent that considerable production time is lost in changing the work holding fixtures to accommodate diversely shaped workpieces.

The general purpose of the present invention is to obviate the above deficiencies by providing a pressure applying apparatus for accommodating various shapes and sizes of work and for mechanically furnishing the required pressure between the workpiece and the tool to relieve the operator of this effort.

It is therefore an object of the present invention to provide a new and improved pressure applying apparatus.

It is another object of the present invention to provide a new and improved pressure applying apparatus which is compact, simple and strong in its construction, rapid and efficient in its operation, and rugged and durable in use.

It is a further object of the present invention to provide a new and improved pressure applying apparatus which will operate effectively to clamp diversely shaped workpieces in position to be acted upon by a tool.

It is still another object of the present invention to provide a new and improved pressure applying apparatus mounted upon a machine tool in such a way that it may be swung away from the working area of the tool to a park position.

It is still a further object of the present invention to provide a new and improved pressure applying apparatus for furnishing the required pressure between a workpiece and a machine tool.

These and other objects of the present invention will become more apparent upon consideration of the following detailed description thereof when taken in conjunction with the following drawings, in which.

Figure 1:
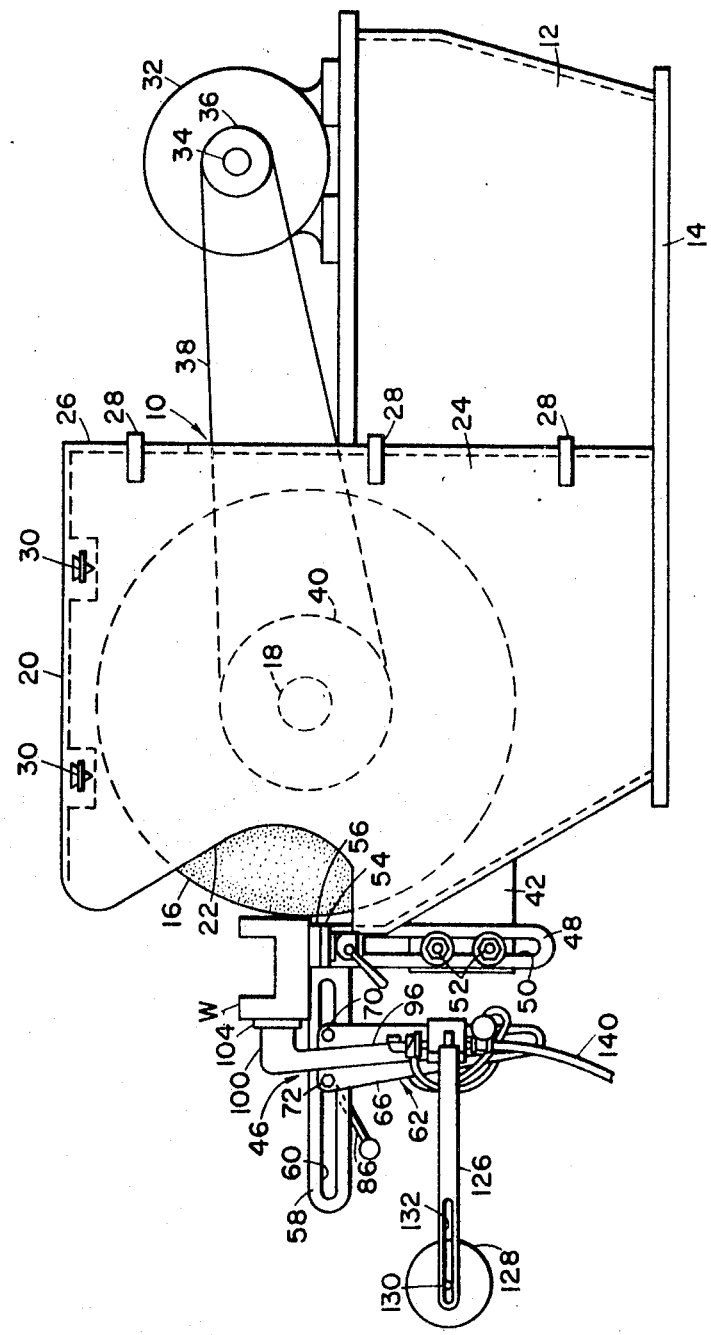
FIG. 1 is a side elevational view of a grinding machine in which a preferred illustrative embodiment of the invention is incorporated.

Referring now to these drawings, it will be observed that a preferred embodiment of this invention is, by way of illustration, incorporated in a grinding machine, generally designated 10, having a rear frame 12 suitably mounted on a base 14. A grinding wheel 16 is suitably rigidly secured to a rotatable spindle 18 for rotation therewith and is partially enclosed by a wheel casing or guard 20, mounted on base 14, for confining debris resulting from the cutting operation. Wheel guard 20 is provided with an arcuate cutaway portion 22 for exposing the active or working surface of the grinding wheel to work. One side wall of the wheel guard 20 comprises a door 24 hingedly connected to the rear wall 26, as by means of suitable pivotal connections 28, for providing access to the grinding wheel 16. Door 24 may be releasably secured to the guard 20 by any suitable clamping means 30.

Rigidly secured onto frame 12 is a motor 32 having an output shaft 34 to which is rigidly secured a drive pulley 36. An endless drive belt 38 is trained about drive pulley 36 and a driven pulley 40 for rotating spindle 18 and thereby grinding wheel 16.

Wheel guard 20 is provided with an extension 42 adjacent the forward end of the grinding mauhine 10 for the purpose of attaching thereto a pressure applying apparatus, hereinafter called a power assist unit, generally designated 46. The power assist unit 46 comprises a vertically extending bar 48 having a longitudinal slot 50 therein for receiving bolts 52 which secure the power assist unit 46 to extension 42. The terms vertically, laterally, horizontally and the like as used herein are referenced to the orientation of the power assist unit as attached to the grinding machine only for convenience of description and should not be taken as limiting the scope of the invention.

An elongated work rest 54 is suitably rigidly secured to the top of bar 48, as by means of welding for example, and extends in a horizontal direction normal to the longitudinal axis of bar 48. An elongated flat plate 56 is disposed on top of work rest 54 and is mounted for pivotal movement relative thereto about a pivotal connection 57 for a purpose hereinafter more fully explained. An elongated bar 58 is rigidly secured to plate 56 and extends horizontally therefrom in a direction normal thereto and is provided with a longitudinal slot 60. Bar 58 forms a T configuration with plate 56 and supports the entire power assist unit 46.

Figure 3:
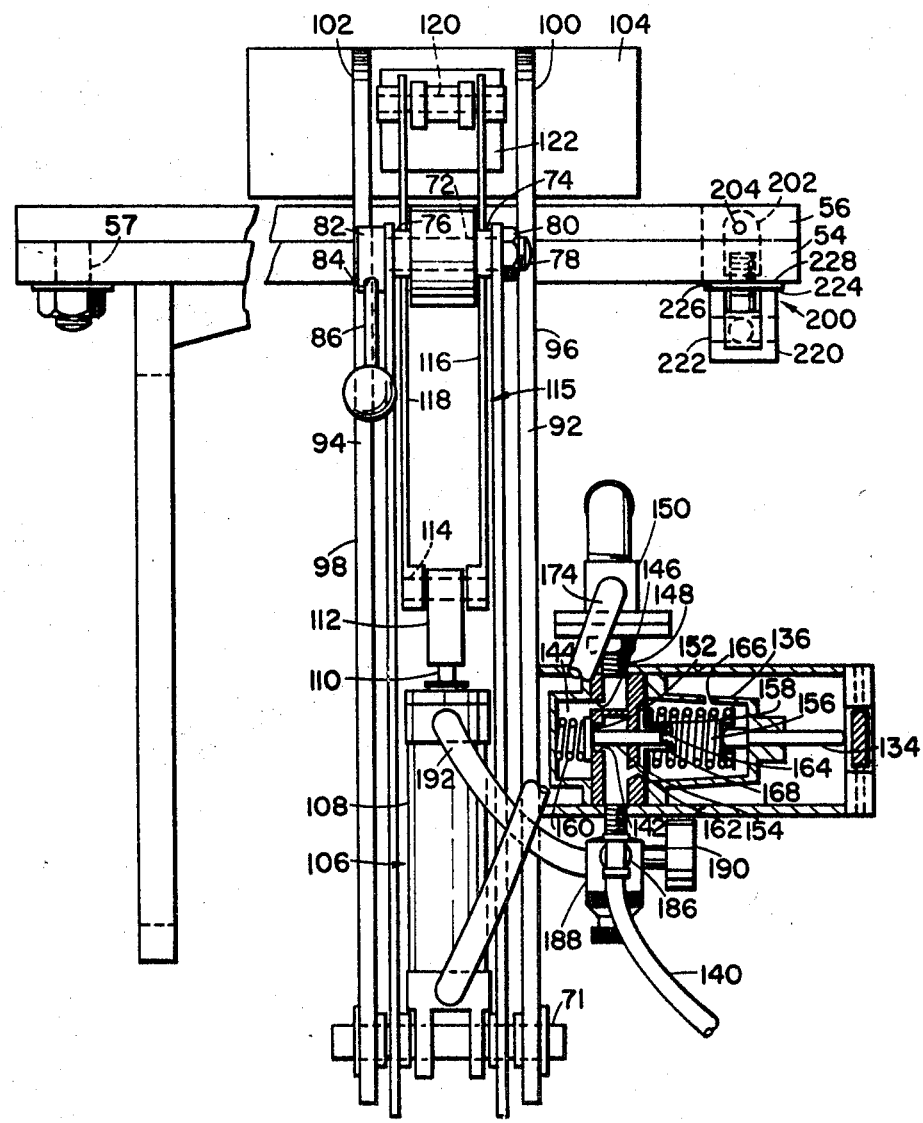
FIG. 3 is an elevational view, partially in section, of the pressure applying apparatus as shown in FIG. 2.

Depending from bar 58 is a slide member, generally indicated 62, having a pair of spaced panels 66 and 68 connected together adjacent the top thereof by a pin 70 and a bolt 72 which ride in the slot 60 of bar 58. The bottom of the slide member 62 is mounted on an elongated shaft 71. Slide member 62 is adjustable along bar 58 to accommodate workpieces of different sizes. With reference to FIG. 3, it will be seen that means are provided for clamping the slide in the desired position, such means comprising a pair of bearing washers 74 and 76 mounted on bolt 72 between the opposite sides of bar 58 and panels 66 and 68, respectively. One end of bolt 72 is provided with threads 78 threadably received in a nut 80 rigidly secured to the side of panel 66. The other end of bolt 72 is provided with an enlarged head 82 having a threaded aperture 84 for receiving the threaded portion of a handle 86. Turning handle 86 in the proper direction threads bolt 72 into nut 80 to secure slide member on bar 58 in the desired position.

Pivotably mounted on shaft 71 is a work holding unit, generally designated 90, comprising a pair of elongated arms 92 and 94 having generally vertically extending portions 96 and 98 and terminating in curved portions 100 and 102, respectively, extending in a horizontal direction generally perpendicular to the vertically extending portions 96 and 98. A vertically extending work engaging abutment 104 is rigidly secured, as by means of welding, to the ends of the curved portions 100 and 102 of arms 92 and 94, respectively.

Means are provided for applying pressure to the work engaging abutment 104, such means comprising a fluid cylinder, generally indicated 106, located between panels 66 and 68 and having a hollow cylindrical casing 108 pivotally mounted on shaft 71. This cylinder contains a piston (not shown) having a piston rod 110 connected to a rod end bearing 112 pivotally mounted on the central portion of a shaft 114. A bell crank, generally designated 115, having a pair of arms 116 and 118, mounted at their one ends on opposite ends of shaft 114, are mounted for pivotal movement about pin 70 which serves as a pivot axis. The other ends of levers 116 and 118 are suitably rigidly secured to a shaft 110 rigidly attached to a plate 122, which in turn is secured to the rear face of abutment 104. Thus, it will be seen that extending piston rod 110 effects pivotal movement of bell crank 115 to move abutment 104 toward the grinding wheel 16.

The means for actuating fluid cylinder 106 comprises an elongated operating lever 126 having a pad 128 adjustably secured thereto by means of a bolt 130 and slot connection 132. The other end of operating lever 126 is engageable with a plunger 134 mounted in a pressure regulating valve 136, said lever 126 being mounted for pivotal movement about a pivot connection 137 located intermediate the opposite ends of lever 126. Pivot connection 137 is mounted on the pressure regulating valve 136 which in turn is suitably rigidly secured to arm 92 of the work holding unit 90.

A source of fluid pressure (not shown) is connected to an inlet supply conduit 140 connected to the regulating valve 136. A passageway 142 connects the inlet supply to a chamber 144 having a passageway 146 leading to an outlet conduit 148 connected to a quick exhaust valve 150. The passageway is normally sealed off from chamber 144 by means of a valve 152 rigidly secured onto a valve stem 154.

When plunger 134 is depressed by operating lever 126, it will force spring 156 onto diaphragm disc 158 which in turn forces the valve stem 154 axially to unseal or open valve 152 against the bias of spring 160 to admit fluid under pressure to chamber 144, through passageway 146, and into outlet conduit 148. When pressure in the supply conduit 140 exceeds a predetermined amount as set by the force of spring 156, pressure admitted through passageway 162 will force the diaphragm disc 158 against the bias of spring 156 to cause the diaphragm disc 158 to part from valve stem 154 and bleed the excess pressure through passageway 164 in diaphragm disc 158 to atmosphere via port 166. It should be noted that an O-ring seal 168 is provided in passageway 164 to prevent any leakage between said passageway and the valve stem 154 during normal operation of the pressure regulating valve 136.

The quick exhaust valve 150 has an inlet port 170 connected to conduit 148, a pressure port 172 connected to the head end of cylinder 106 by means of conduit 174, and an exhaust port 176 leading to atmosphere. Valve 150 is provided with a flexible diaphragm 178 located in a chamber 180 of valve 150 which normally seats on the cylindrical wall 182 of exhaust port 176 for sealing off the exhaust when fluid under pressure is admitted to the inlet port 170. It will be observed that the chamber 180 is provided with a plurality of radially extending grooves 184 circumferentially disposed about the chamber 180 for admitting fluid under pressure to the pressure port 172. When fluid pressure in inlet port 170 is shut off, the greater fluid pressure in pressure port 172 will unseat diaphragm 178 from wall 182 of exhaust port 176 and establish communication through the exhaust port 176 to "dump" the fluid pressure in the head end of cylinder 106 to atmosphere.

Connected to the inlet supply conduit 140 is a T-fitting 186 for admitting fluid under pressure into a pressure regulating valve 188 having a gauge 190 for adjusting the amount of pressure passing therethrough and through a conduit 192 leading to the rod end of cylinder 106. Thus, a slight amount of air pressure is always maintained at the rod end of cylinder 106 and assists in retracting piston rod 110 and thereby abutment 114 away from the grinding wheel when pressure is evacuated from the head end of cylinder 106.

As hereinbefore mentioned, plate 56 is mounted for pivotal movement relative to work rest 54 about a pivotal connection 57, and since bar 58 which carries the entire power assist unit 46 is rigidly secured to plate 56, it will be seen that the entire unit can be swung aside to a "park position," if desired. In order to maintain the power assist unit in its operative position, a cam lock clamping means, generally designated 200, is provided for securing plate 56 onto work rest 54. Such means comprise a lug 202 pivotally mounted on a shaft 204 secured at either end in plate 56. A slot 206 and a slot 208 are provided in plate 56 and work rest 54, respectively, for accommodating lug 202. A pin 210 having a threaded portion 212 at one end thereof is threadably received in a threaded bore 214 of lug 202, the other end of pin 210 having a transverse bore 215 for receiving a shaft 216 rotatable therein. A handle 218 is provided with a pair of tines 220 and 222 rigidly secured to shaft 216 for pivotal movement therewith, said tines having cammed surfaces 224 and 226, respectively. The cammed surfaces are adapted to bear against a resilient washer 228 freely slideable on pin 210, said washer being adapted to bear against the bottom surface of work rest 54. By raising handle member 218 into the position shown in FIG. 2, washer 228 is cammed against the bottom surface of work rest 54 to secure plate 56 and thereby the power assist unit 46 into operative work clamping position.

Figure 2:
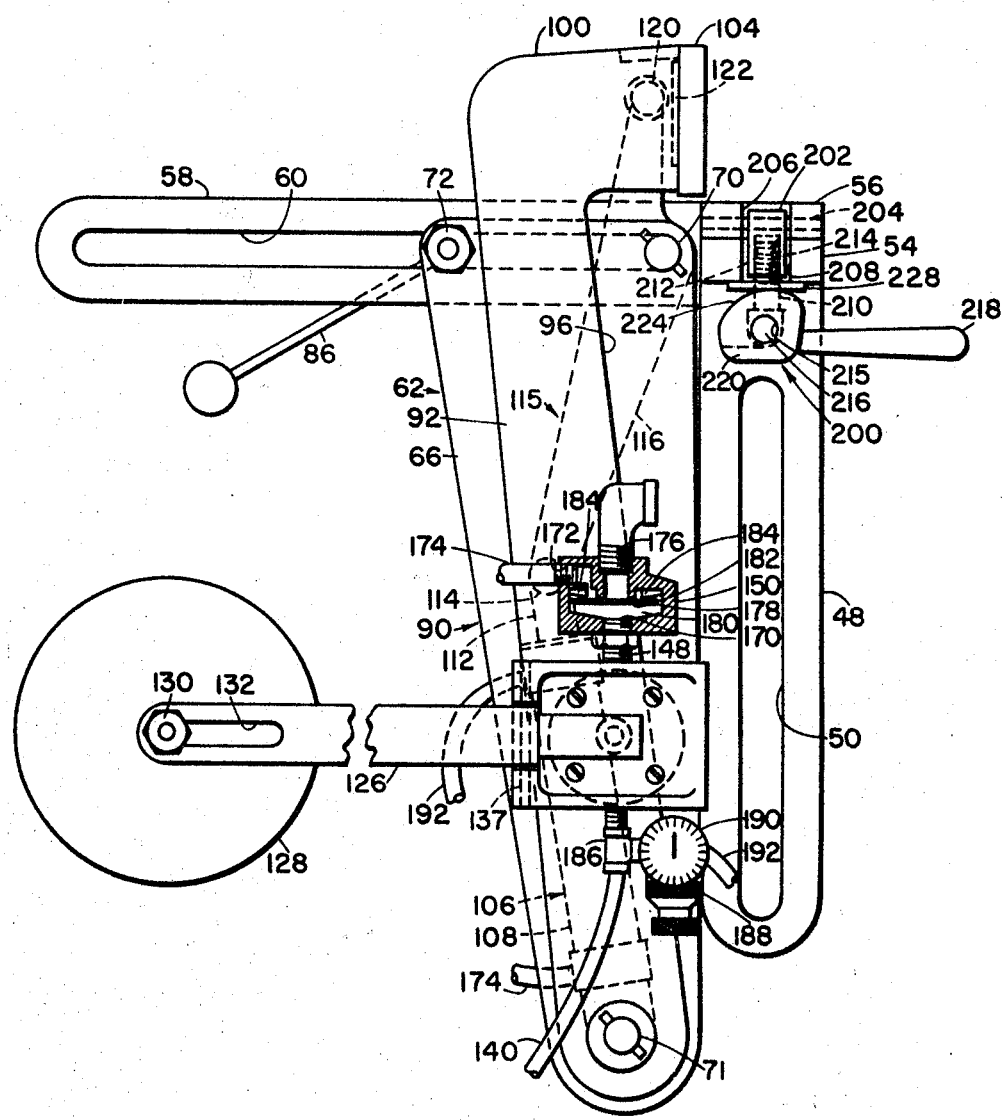
FIG. 2 is an enlarged side elevational view illustrating the pressure applying apparatus constructed in accordance with the principles of this invention.

In operation, handle member 218 is raised into the position shown in FIG. 2 to urge washer 228 against the bottom surface of work rest 54 and lock the power assist unit in place. A workpiece is deposited on plate 56 and the power assist unit 46 is adjusted along bar 58 and locked by handle 86 into operative position.

The operator presses pad 128 with the side of his right leg to actuate operating lever 126, which in turn depresses plunger 134. This force is transmitted through spring 156, diaphragm disc 158, valve stem 154 to open valve 152 against the bias of spring 160 for admitting fluid under pressure through chamber 144, passageway 146, conduit 148, inlet port 170 of valve 150, chamber 180, grooves 184, pressure port 172, and conduit 174 into the head end of cylinder 106 for actuating the piston therein. Piston rod 110 pivots the bell crank 115 about pin 70 to advance abutment 104 into engagement with the workpiece W and apply pressure thereto. The slightest movement of operating lever 126 causes abutment 104 to advance and additional movement increases the force with which the workpiece is pressed against the grinding wheel. When the operating lever 126 is moved to the end of its stroke, the maximum pressure the power assist unit is capable of exerting is being applied to the workpiece.

Upon releasing the pressure applied to pad 128 and thereby operating lever 126, valve 152 is returned to its closed position by means of spring 160. Pressure in the head end of cylinder 106 and conduit 174 forces diaphragm 178 of quick exhaust valve 150 off cylindrical wall 182 to exhaust fluid under pressure through exhaust port 176 to atmosphere. For extremely large workpieces, or pieces that must be rocked, the complete power assist unit can be released by means of cam lock clamping means 200 and swung aside. The workpiece may then be supported on work rest 54.

As a result of this invention, an improved pressure applying apparatus is provided for securing workpieces in position to be acted upon by a tool in an improved and more efficient manner. An advantage residing in the use of the power assist unit of this invention is that operator fatigue is reduced. Also, the operator may hold the work at a point remote from the tool to insure a safer operation. Moreover, side of the leg actuation leaves both hands free and both feet planted firmly on the floor.

A further advantage residing in the power assist unit of this invention is that the entire unit can be swung aside to a park position when not being used and, when in use, accommodate workpieces of various sizes and designs.

A preferred embodiment of the principles of this invention having been hereinbefore described and illustrated, it is to be realized that modifications thereof can be made without departing from the broad spirit and scope of this invention as defined in the appended claims.

I claim:
1. An apparatus for pressing a workpiece against a machine tool comprising: a work rest; a member pivotally mounted on said work rest; a slide carried by said member and slideable therealong; said member having a work supporting portion; an abutment having a work engaging surface extending generally normal to said work supporting portion; means mounting said abutment on said slide for pivotal movement about a horizontal axis; and means carried by said slide for actuating said abutment and urging said work engaging surface thereof against a workpiece.

2. An apparatus as defined in claim 1 including means for securing said slide on said member.

3. An apparatus as defined in claim 2 wherein said means for actuating said abutment comprises a bell crank connected to said abutment; and fluid pressure means for pivoting said bell crank.

4. An apparatus as defined in claim 3 wherein said fluid pressure means includes a fluid actuating cylinder having a head end and a rod end connected to said bell crank.

5. An apparatus as defined in claim 4 wherein said fluid pressure means includes a source of fluid pressure and valve means for directing fluid under pressure to the head end of said cylinder.

6. An apparatus as defined in claim 5 wherein a plunger controls actuation of said valve means; and an operating lever is provided for depressing said plunger.

7. An apparatus as defined in claim 6 wherein said fluid pressure means includes a second valve means for quickly exhausting fluid under pressure from the head end of the cylinder.

8. An apparatus as defined in claim 7 wherein said pressure fluid means includes a third valve means for directing fluid under pressure to the rod end of the cylinder.

9. An apparatus as defined in claim 8 wherein said fluid under pressure to the rod end of the cylinder is of a lesser force than the fluid under pressure to the head end of the cylinder.

References Cited

UNITED STATES PATENTS

| 642,452 | 1/1900 | Hull | 51—215 X |
| 1,868,266 | 7/1932 | Woodsend | 51—98 |
| 2,107,566 | 2/1938 | Gardner | 51—98 |
| 2,686,994 | 8/1954 | Wyborski. | |

OTHELL M. SIMPSON, Primary Examiner

U.S. Cl. X.R.

51—98; 143—51